US 6,704,013 B2

(12) United States Patent
Hosea (10) Patent No.: US 6,704,013 B2
(45) Date of Patent: Mar. 9, 2004

(54) FUNCTION GRAPHING METHOD WITH DETECTION OF DISCONTINUITIES

(75) Inventor: Michael E. Hosea, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 354 days.

(21) Appl. No.: 09/727,651

(22) Filed: Dec. 1, 2000

(65) Prior Publication Data

US 2002/0067357 A1 Jun. 6, 2002

Related U.S. Application Data

(60) Provisional application No. 60/168,697, filed on Dec. 3, 1999.

(51) Int. Cl.$^7$ ............................................... G06F 15/00
(52) U.S. Cl. ....................................................... 345/440
(58) Field of Search ................................. 345/440, 441, 345/619, 440.01; 708/446

(56) References Cited

U.S. PATENT DOCUMENTS

| 4,031,370 A | * | 6/1977 | Catherall ..................... 708/290 |
| 4,545,067 A | * | 10/1985 | Juvin et al. .................. 382/153 |
| 4,794,553 A | * | 12/1988 | Watanabe et al. ........... 708/160 |
| 5,532,946 A | * | 7/1996 | Phipps et al. ................ 708/174 |

* cited by examiner

Primary Examiner—Phu K. Nguyen
(74) Attorney, Agent, or Firm—Bret J. Petersen; W. James Brady, III; Frederick J. Telecky, Jr.

(57) ABSTRACT

A function graphing method for detecting discontinuities. The method involves scanning piecewise linear segments of the function graph and detecting large changes in the angle between segments. When such changes in angle are found, a bisection routine is performed to determine whether a discontinuity exists between the end points of a segment.

21 Claims, 6 Drawing Sheets

TAN (x)

FIG. 2B

TAN (x)

FLOOR (x)

FIG. 3B

FLOOR (x)

FUNCTION GRAPHING METHOD WITH DETECTION OF DISCONTINUITIES

This application claims priority under 35 USC §119(e)(1) of provisional application No. 60/168,697 filed Dec. 3, 1999.

TECHNICAL FIELD OF THE INVENTION

This invention relates to function graphing software, and more particularly to graphing software that detects and more renders discontinuities, including asymptotes.

BACKGROUND OF THE INVENTION

Electronic calculators have become an essential tool for students. Students of all levels have a wide choice of calculator types and models.

Many students still own relatively inexpensive scientific calculators with one or two line displays, but recently more and more students are discovering the advantages of graphing calculators. Graphing calculators are characterized by a larger screen, which permits the entry of mathematical expressions in a logical format. They also permit graph displays and table displays. They have sophisticated programming capability. They often permit data transmission to other computing devices, directly or via a data storage medium, as well as data collection via various interface protocols.

When graphing, conventional graphing calculators tend to assume that every function is continuous. They do not properly render functions across asymptotes and other discontinuities. In general, the problem is one of determining when not to connect points that are not supposed to be connected.

The graphing software used by graphing calculators is typically more streamlined than graphing software used for execution on general purpose computers. The latter may more readily implement complex algorithms, such as algorithms designed to handle discontinuities. One function graphing software package that attempts to deal with discontinuities is marketed under the product name DERIVE from Soft Warehouse, Inc. It attempts to provide graphs in which points are not connected when there appears to be a discontinuity. Graphing calculators sometimes implement a simple scheme to not connect graph points which are outside the y-range of the graphing window on opposite sides. This may be based also on information obtained from other nearby plotted points, but such schemes are extremely unreliable and do nothing to detect jump discontinuities.

Another type of mathematics software that might attempt to detect discontinuity is root solver software. However, root solvers typically apply an iterative procedure over a single, small interval that is determined by the user to be one which may contain a root and which may contain a discontinuity instead. Graphing software, on the other hand, is typically applied over much larger ranges containing many intervals of interest, and the user does not provide any information about which intervals may contain discontinuities.

SUMMARY OF THE INVENTION

One aspect of the invention is a computer-implemented method of detecting discontinuities in functions. The method is especially suitable for graphing calculators, because of the speed and efficiency with which it may be performed with a general purpose processor.

First, a set of function values is calculated. Each successive pair of function values determines a line segment that approximates a small piece of the function curve. Any pair of line segments having an angle between them greater than a predetermined threshold angle is detected. For each such pair of line segments, at least one of the segments is bisected and a new function value is calculated at the bisection point. This new function value is analyzed to determine if the function is continuous. The analysis involves determining whether the new function value is between the function values on either end of the bisected segment. The bisecting and analyzing steps may be repeated for a predetermined number of iterations, with the process ending if the function is concluded to be continuous or discontinuous there. Further processing may be performed to determine the type of discontinuity and its behavior.

An advantage of the invention is that discontinuities are reliably detected. This leads to improved graphical rendering. The method meets processing constraints imposed by graphing calculators. For function graphing, as opposed to root solving, cost is a significant consideration because they are many intervals to consider not just one. When there are no discontinuities, the processing overhead is slight.

DETAILED DESCRIPTION OF THE INVENTION

Figure 1:
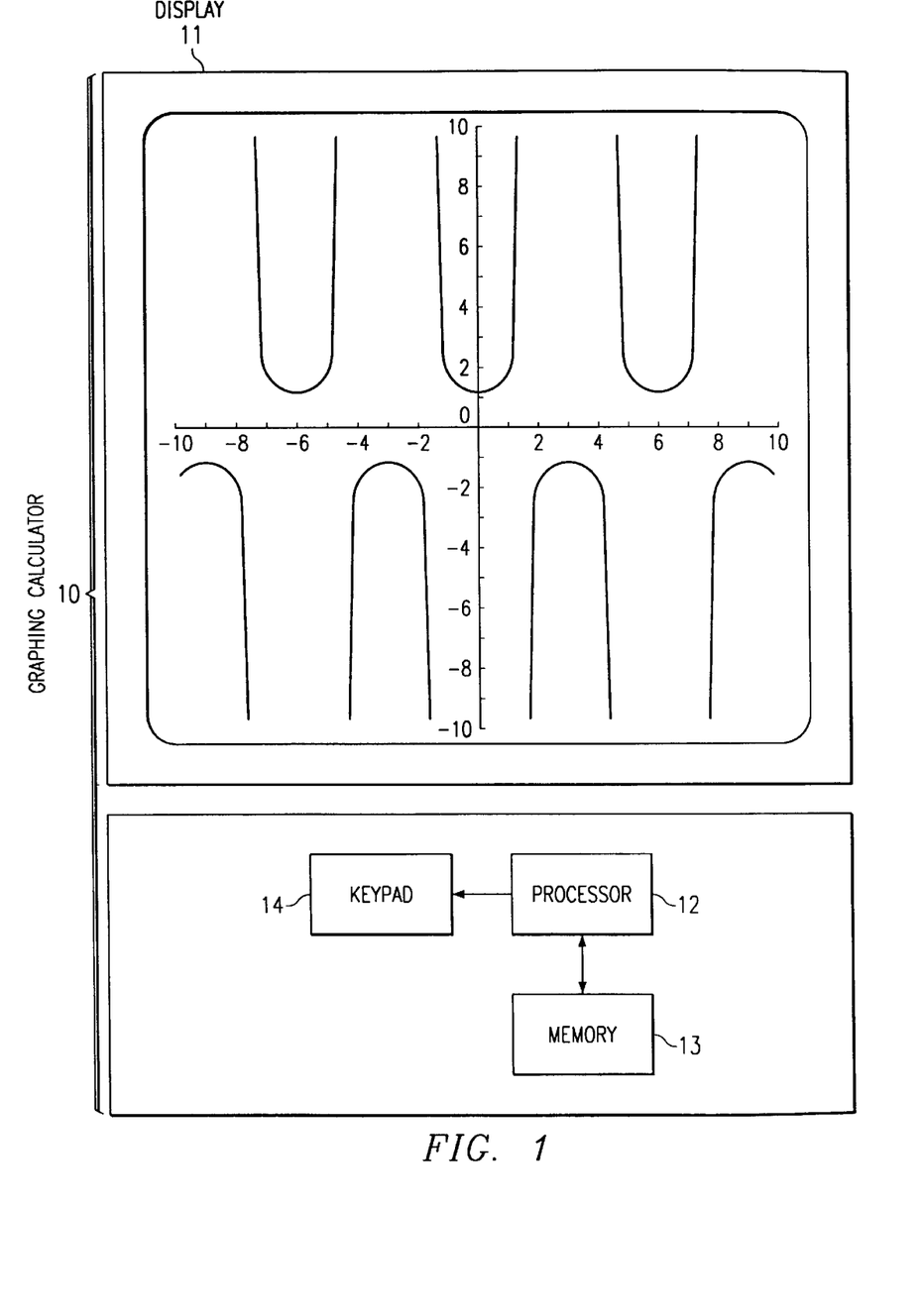
FIG. 1 is a block diagram of a graphing calculator in accordance with the invention.

FIG. 1 is a block diagram of a graphing calculator 10, programmed to perform discontinuity detection and rendering in accordance with the invention. The discontinuity detection and rendering methods described herein are directed to both jump discontinuities and vertical asymptotes, as those mathematical features are commonly defined.

Calculator 10 is described herein in terms of a "generic" graphing calculator. Apart from the programming that is the subject of this description, calculator 10 has features that are typical of graphing calculators. The discontinuity detection and rendering features described herein could incorporated into any calculator that provides graphical displays. Also, although the programming is especially suitable for graphing calculators because of its efficiency, it could be implemented in graphing software executed on a general purpose computer. In general, the invention may be implemented with any computing system having appropriate processor and memory resources, such as the processor 12 and memory 13 of calculator 10.

In FIG. 1, the screen 11 of calculator 10 has a "graphical display", as that term is used herein. As is typical of graphing calculators, functions are graphed using piecewise rendering techniques. In the example of this description, screen 11 has 80 pixels in the horizontal direction, i.e., the x axis. To graph a function, 80 points are calculated and plotted. More specifically, a function value is calculated for each column of pixels, and the value is used to determine which pixel of each column should be lit, if any. The "pieces" of the graph are line segments from lit pixel to lit pixel in adjacent columns. However, piecewise rendering can also be accomplished with a larger or smaller distance between x values, that is, more or less than one pixel. In any case, the piecewise rendering of graphing calculators normally does not take advantage of spline interpolation or other advanced techniques occasionally implemented in graphing software for general purpose computers, though the invention might still be applied in some cases.

In addition to processor 12, memory 13, and keypad 14, various hardware features include an I/O port for data linking and unit to unit cable connection capability. In addition to the ability to draw graphical displays of various types, some of the other software features of calculator 10 are the capability for stacked fractions, constant features, English and metric conversions, data loading and storage, and keystroke programming.

The image being displayed on screen 11 in FIG. 1 is of a discontinuous function, rendered in accordance with the invention. A discontinuous function is a function that fails to be continuous at a point c; c being a point of discontinuity.

Figure 2A:
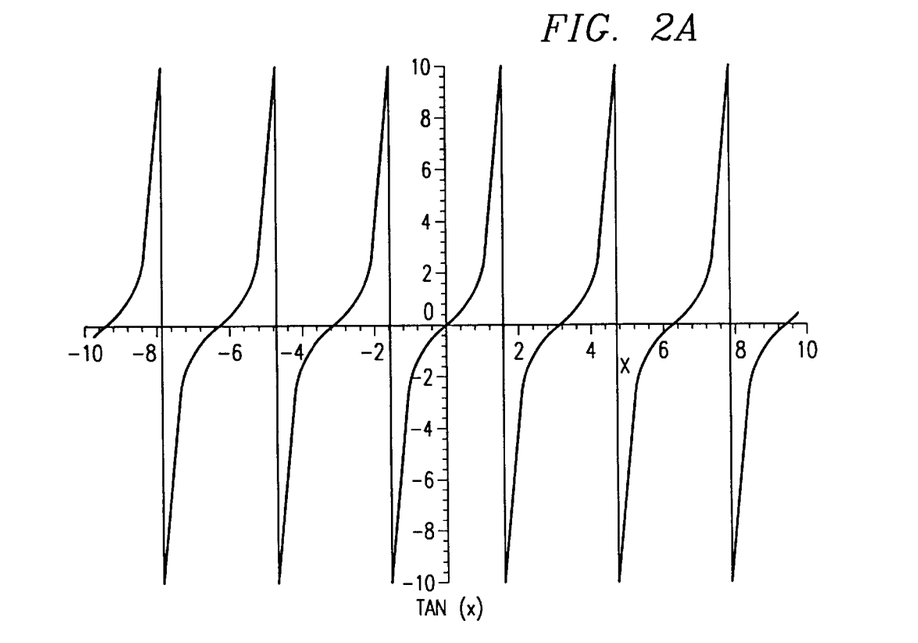
FIGS. 2A and 2B illustrate incorrectly rendered and correctly rendered graphs, respectively, of a discontinuous function having asymptotes.
Figure 2B:
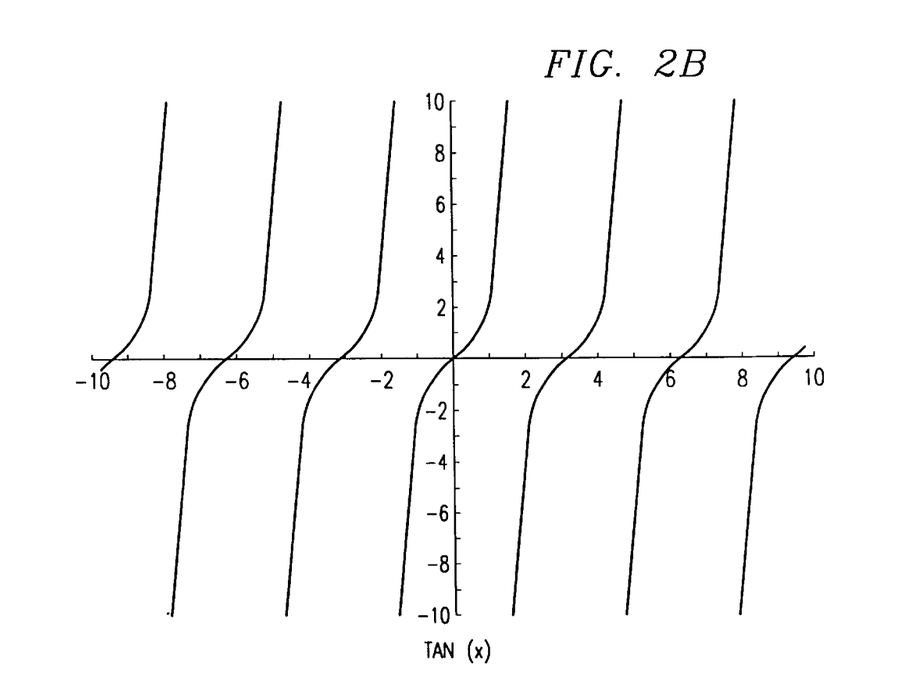
Figure 2C:
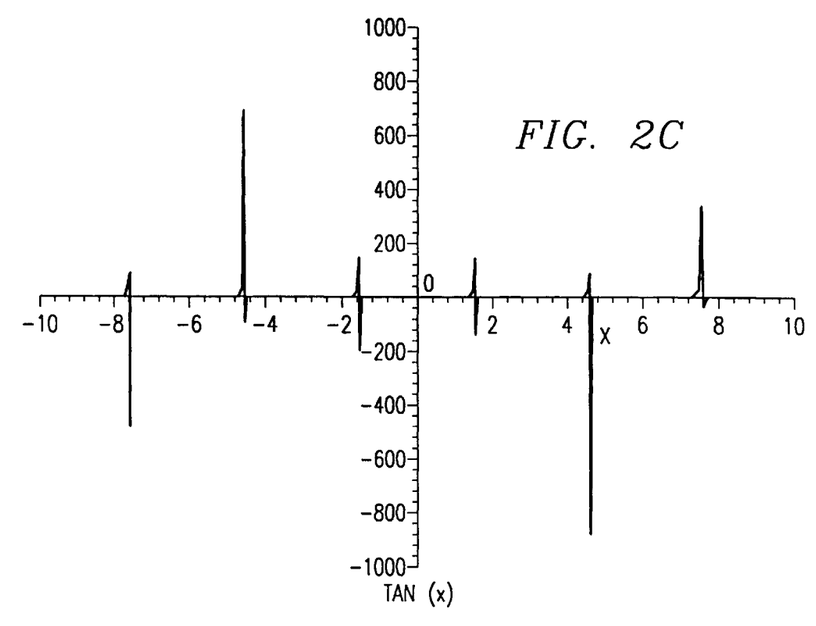
FIGS. 2C and 2D illustrate incorrectly rendered and correctly rendered graphs, respectively, of the function of FIGS. 2A and 2B, but on a smaller scale.
Figure 2D:
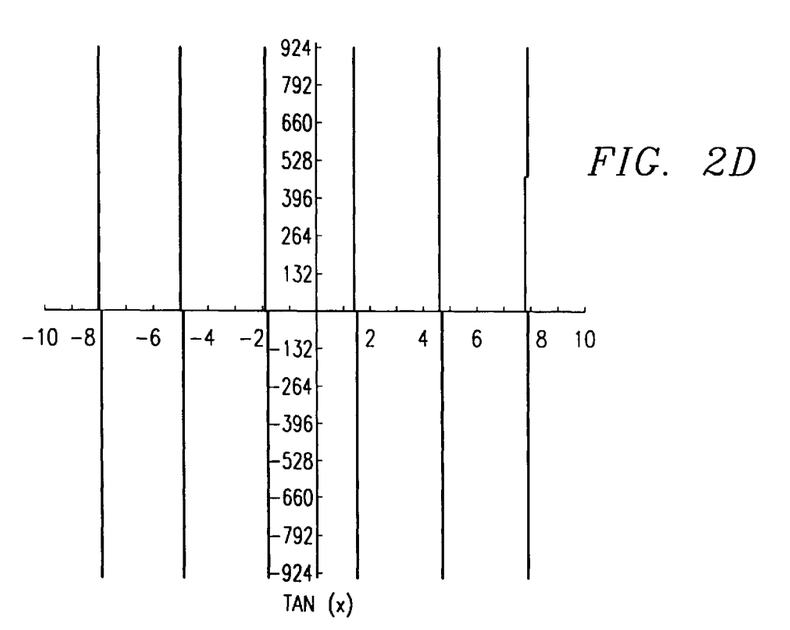

FIGS. 2A and 2B illustrate pixel displays of the discontinuous function tan(x), which has vertical asymptotes. FIG. 2A is an incorrect graph, that is, a graph not in accordance with the invention and having very steep line segments connecting points just on the left of asymptotes to points just on the right. FIG. 2B is drawn in accordance with the invention, and correctly illustrates the function. FIGS. 2C and 2D are pixel displays of the same function, tan(x), but with a larger scale on the y axis. FIG. 2C is incorrect, whereas FIG. 2D is correct.

A common misconception is that the software producing the incorrect figure has attempted to draw the vertical asymptotes, that is, to draw vertical lines to represent vertical asymptotes in addition to drawing the function curve. As illustrated by both FIGS. 2A and 2C, when the scale on the y axis is increased, the incorrect graphs become less like the actual function, and it becomes clear that the steep line segments are not vertical lines. Increasing the y scale will also tend to defeat any scheme for handling asymptotes that is based primarily on function values falling outside the y-range of the graph window.

Figure 3A:
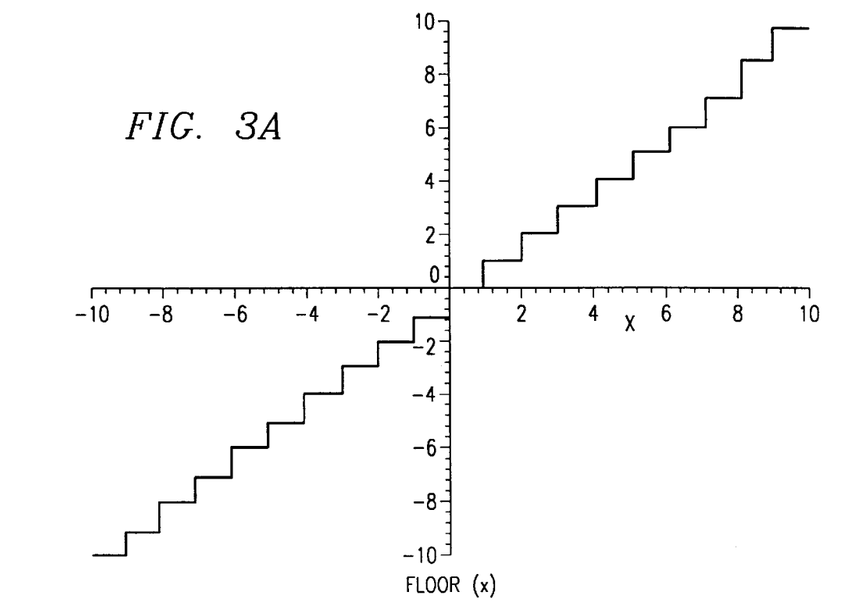
FIGS. 3A and 3B illustrate incorrectly rendered and correctly rendered graphs, respectively, of a function having a jump discontinuity.
Figure 3B:
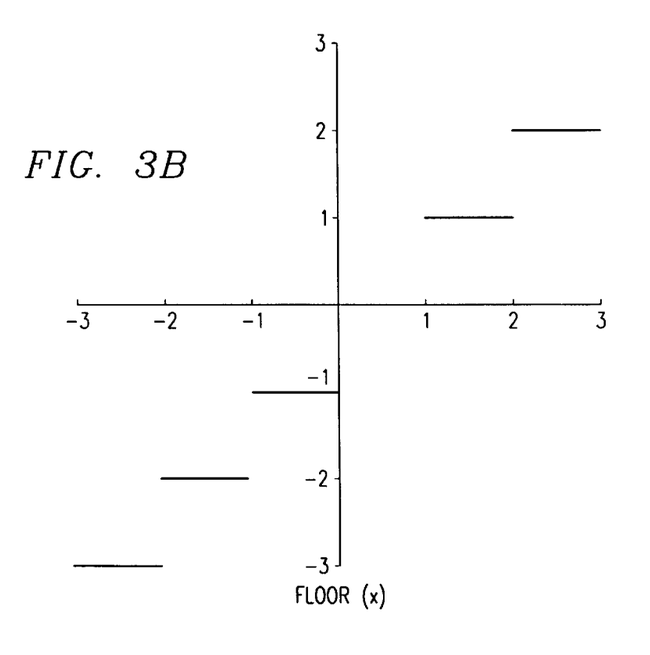

FIGS. 3A and 3B illustrate graphs of the discontinuous function, floor(x), which has jump discontinuities. FIG. 3A is an incorrect graph and has lines connecting across the discontinuities. FIG. 3B is drawn in accordance with the invention, and correctly illustrates the function.

Figure 4:
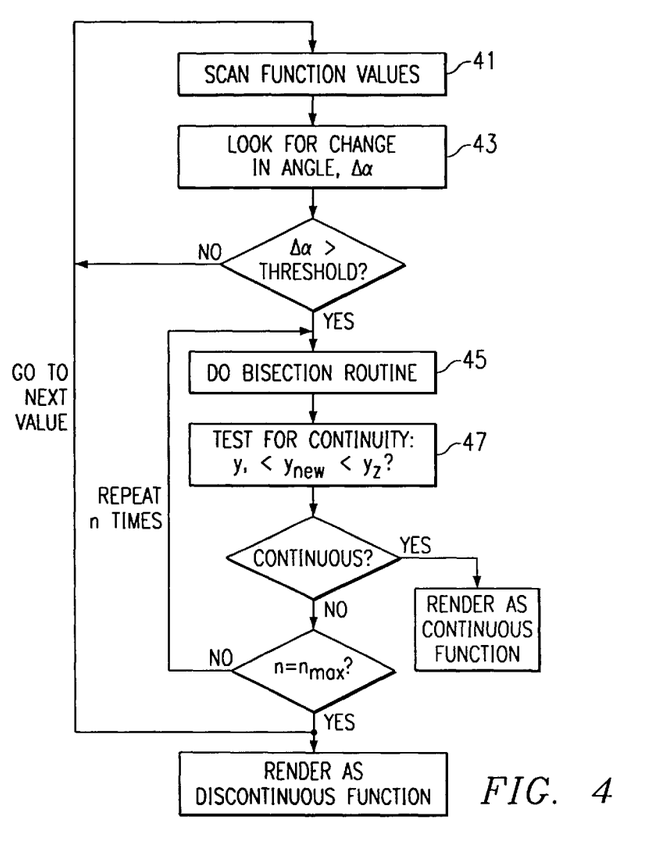
FIG. 4 illustrates the method of the invention, which may be implemented as programming for the calculator of FIG. 1.

FIG. 4 illustrates the method of the invention, as a series of steps executed by processor 12 of calculator 10. As indicated above, calculator 10 is assumed to have appropriate processing and memory capability for executing software that implements the method of FIG. 4.

In Step 41, a set of function values is calculated. Typically, this set of values is comprised of a value for each pixel column in the x direction, but more or fewer values could be used. For piecewise linear rendering, each adjacent pair of values determines a line segment, and the collection of lines segments forms a graph of the function.

In Step 43, the function values are scanned to detect sharp angles made by adjacent line segments of the piecewise linear representation of the function. If the scaling of the x axis differs greatly from the scaling of the y axis, as may happen in some scientific applications, the angle measures used in this process may take account of the aspect ratio of the axes so that the angle measures correspond to how the angles appear to the eye when drawn. The detection of sharp angles is based on the premise that continuous functions tend to have small variations in angle from segment to segment. If the function is continuous and a sufficient number of points are calculated to show the basic shape of the curve, the angle between any two segments (three consecutive points) will tend to differ only by small amounts.

Figure 5:
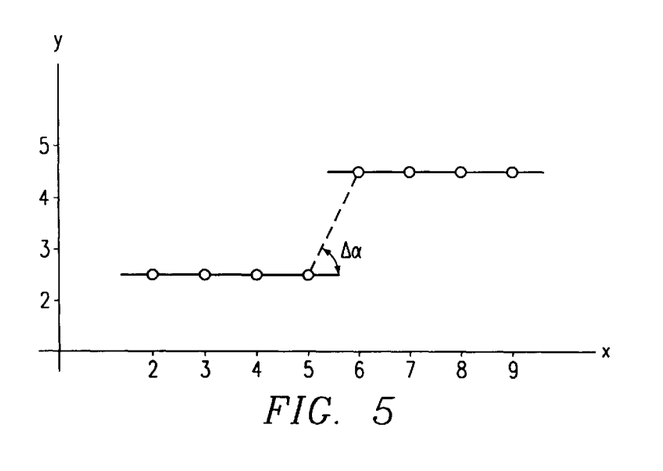
FIG. 5 illustrates Step 43 as applied to a function having a jump discontinuity.

FIG. 5 illustrates Step 43 with respect to a function having jump discontinuities, such as the step function of FIGS. 3A and 3B. The points represent the (x,y) pairs, where the y values are the calculated function values. The solid lines represent the "true" function. The dotted line represents a jump from one calculated point to a next. In the absence of the method of the invention, the graph of the function might be incorrectly rendered as lines connecting the points, including the dotted line. A possible discontinuity is detected by locating the abrupt change in angle from one line segment to the next. In the example of FIG. 5, the segment from x=4 to x=5 has an angle of 0. The next segment, from x=5 to x=6, has an angle of approximately 60 degrees. This is considered an abrupt change in angle $\Delta\alpha$, greater than some predetermined threshold value of $\Delta\alpha$. This threshold value can be a parameter set within the computer programming. An example of a typical threshold value is 30 degrees.

In practice, Step 43 may be accomplished by calculating the set of $\Delta\alpha$ values between successive line segments. A zero reference angle is established, and all line segments are relative to this reference. The segment angles may then vary from −180 to 180 degrees. An arctan function may be used. The angle between each two successive segments is calculated, and the difference, $\Delta\alpha$, compared to the threshold value.

Figure 6:
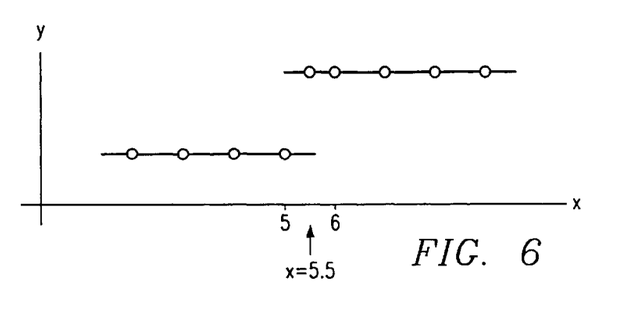
FIG. 6 illustrates Step 45 as applied to the function of FIG. 5.

Step 45 is performing a bisection to determine whether the abrupt angle change holds up at higher resolution. In the example of FIG. 6, the segment from x=5 to x=6 is bisected and the function evaluated at the midpoint. As indicated, at x=5.5, the y value is the same as that at x=6.

For efficiency, Step 45 may be performed only on the segment on the side of the angle that is most likely to reveal a discontinuity. This is the segment having the biggest difference in y values. Thus, in FIG. 5, the segment from x=4 to x=5 has no change in y value, whereas the segment from x=5 to x=6 changes from y=2.5 to y=4.5. Thus, the segment from x=5 to x=6 is bisected. The same is true for successive iterations of Step 45—each bisection is performed on the segment on the side of the previous bisection that has the largest change in y value.

In Step 47, the results of the bisection are analyzed to determine if continuity is indicated. If the function were continuous, any new y values would eventually lie between the "steps". But if this does not occur after a predetermined number of iterations, it can be concluded that there is a jump discontinuity at some value between x=5 and x=6.

Typically more than one bisection is performed before a function is concluded to be continuous. Thus, in the example of FIG. 5, multiple function values are calculated before concluding that there is sufficient evidence of continuity. Requiring that the continuity test be "passed" for at least a few iterations allows the detection of discontinuities that are not well resolved by the calculated graph points. Requiring that the continuity test be "failed" for a fixed number of iterations before determining that there is a discontinuity accommodates continuous functions that have sudden changes or that vary greatly between graph points. Over several bisection iterations, even such a function would reveal some consistency in having new y values between the bisected y values. In practice, a suitable approach is to repeat Steps 45 and 47 such that if new function values are between old function values three consecutive times, the function is deemed continuous.

Until there is sufficient evidence of continuity, Steps 45 and 47 are repeated for a set number of iterations. In the example of FIG. 5, for so long as Steps 45 and 47 are repeated, and the segments on either side of x=5.5 are again bisected, it would be found that the y values lie either on one y value or the other. After a predetermined number of iterations with no evidence of continuity, it is concluded that the function is discontinuous. The function is then appropriately rendered between the two original graph points as having a jump discontinuity or having a vertical asymptote, as the case may be.

Figure 7:
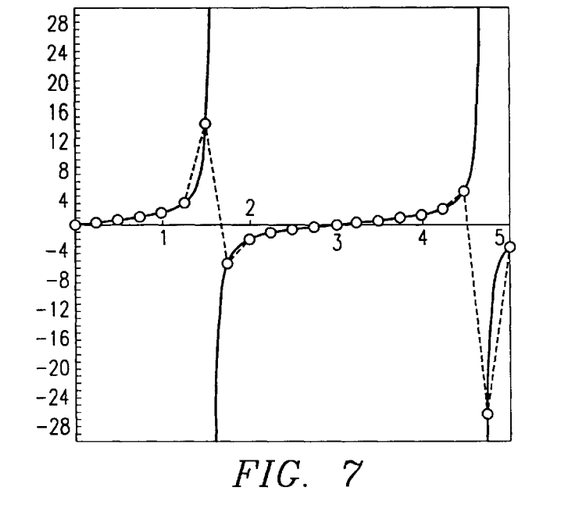
FIG. 7 illustrates Step 43 as applied to a function having asymptotes.
Figure 8:
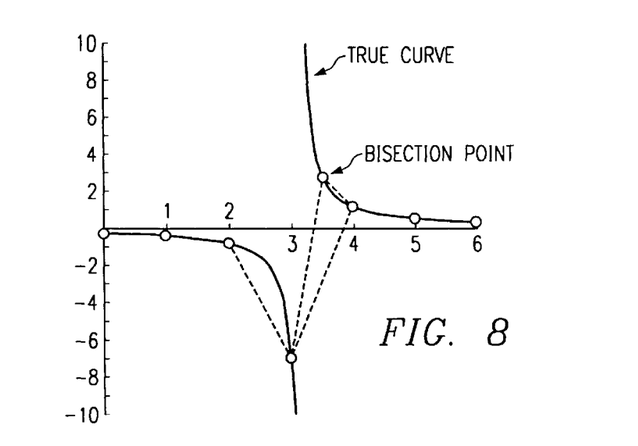
FIG. 8 illustrates Step 45 as applied to a function having asymptotes.

FIGS. 7 and 8 illustrate the method of FIG. 4, as applied to a function with a vertical asymptote. In FIG. 7, there are five points calculated and plotted between each x integer value. In the absence of the method described herein, the function would be plotted as straight line segments connecting the points, indicated in FIG. 7 as dotted lines.

In Steps 41 and 43, the function values are calculated and scanned, and the sudden changes in angle are detected. As indicated in FIG. 7, there are a number of segments having large changes in angle.

Wherever a large angle change is detected, Step 45 is performing a bisection routine on at least one side of the vertex. If only one side is to be analyzed, the side with the larger change in y values is chosen. FIG. 8 illustrates the bisection routine performed with respect to a function having a sharp angle defined by the calculated function values at x=2, x=3, and x=4. The segment from x=3 to x=4 has the bigger change in y value. Thus, the function value at x=3.5 has been calculated.

In Step 47, the new function value is evaluated for continuity. In the example of FIG. 8, the new function value is not between the function values of x=3 and x=4, indicating that the function is not continuous. Conversely, a function value between the two previously calculated function value would have indicated a continuous function.

Because there is no evidence that the function is continuous, Steps 45 and 47 are repeated. In the example of FIG. 8, the segment between x=3 and x=3.5 would be next evaluated because this side has the greater change in y values.

The "continuity test" of Step 47 is the same for both jump continuities and asymptotes. Where an interval with endpoints having y values Y1 and Y2 is bisected, the new function value is Ynew. Step 47 may be expressed mathematically as:

$$\text{Min}(Y1,Y2)<Ynew<\text{Max}(Y1,Y2)?$$

If the condition is true for a predetermined number of iterations, the function is deemed continuous. If the condition is not true, the function is further tested for continuity. The number of iterations performed before a function is deemed continuous may very depending on considerations such as processing power and desired accuracy. For example, a single iteration could be performed. Or, a constraint might be imposed that Ynew be between Y1 and Y2 for a set number of successive iterations.

Other variations of Step 47 are possible. The test might be for discontinuity, such that a set number of values of Ynew not between Y1 and Y2 is deemed sufficient evidence of discontinuity.

Comparing the method of FIG. 4 as applied to jump discontinuities with the method as applied to asymptotes, it can be seen that the results of Step 47 may be further analyzed to determine the type of discontinuity. In the case of jump discontinuities, Ynew tends to be close to Y1 or Y2. In the case of the asymptote, Ynew gets large relative to Y1 or Y2.

To confirm that the discontinuity is an asymptote and not a jump discontinuity, a "normal" range of variation for the function values is determined. If an x value happens to be very close to an asymptote or perhaps even on an asymptote, its associated y value tends to be very large compared to most other y values. These "outliers" need to be removed before determining a normal range of variation of the function over the graph interval. For efficiency reasons it is often impractical to compute which y values are outliers by traditional statistical methods. However, a histogram of y values can be used to determine limits on the vast majority of function values. A safety factor can then be applied to establish a normal range of variation that is very likely to cover nearly all function values in the graphing interval that are not adjacent to vertical asymptotes. As iterations of the bisection routine are performed, an asymptote is diagnosed when function values leave the normal range. In rendering a line connects a plotted point to the upper or lower boundary of the graph window to simulate the asymptotic behavior of the function. Optionally, a vertical line may be drawn to represent the asymptote itself.

If processing time is to be minimized, a simpler approach that can yield similar results is to utilize the final bisection data. The segment with the larger change in y value at then end of the bisection iterations is considered to cross the vertical asymptote or jump discontinuity. Instead of attempting to determine the nature of the discontinuity, the two endpoints of the final bisection segment are inserted into the graph and connected to the adjacent graph points. The new points are not connected to each other, however, because the discontinuity is considered to lie between them. If the discontinuity is due to an asymptote, the new points will tend to have more extreme y values because they tend to be much closer to the asymptote than the original plotted points. In the case of a jump discontinuity, the insertion of the new points may be imperceptible.

Other Embodiments

Although the present invention has been described in detail, it should be understood that various changes, substitutions, and alterations can be made hereto without departing from the spirit and scope of the invention as defined by the appended claims.

What is claimed is:

1. A graphing calculator that detects and renders discontinuous functions, comprising:
   a screen capable of displaying a function as a series of line segments;
   a processor for executing graphing programming that instructs the processor to perform the following steps:

calculating function values for the function, each successive pair of function values representing one of the segments; detecting any line segments having an angle between them greater than a predetermined threshold angle; bisecting at least one of such segments and calculating a new function value at a bisection point; analyzing the new function value to determine if the function is continuous; and repeating, for a number of iterations, the bisecting and analyzing steps; and a memory for storing the graphing programming.

2. The calculator of claim 1, wherein the bisection point is on the segment having the largest magnitude of change in function value.

3. The calculator of claim 1, wherein the processor performs the analyzing step by determining whether the new function value is between the function values on the bisected segment.

4. The calculator of claim 1, further comprising the step of rendering the function as a continuous function if the new function value is between the function values on the bisected segment for at least one iteration.

5. The calculator of claim 1, further comprising the step of rendering the function as a discontinuous function if the new function value is not between the function values on the bisected segment for at least one iteration.

6. The calculator of claim 1, further comprising the step of rendering the function with a jump discontinuity if at least one new function value is the same as a function value on the bisected segment.

7. The calculator of claim 1, further comprising the step of rendering the function with an asymptote if at least one new function value is not between the function values at either end of the bisected segment and not the same as (or close to) one these function values.

8. The calculator of claim 7, further comprising the step of analyzing a collection of function values to determine the behavior of the asymptote.

9. The calculator of claim 1, wherein the iterations end if the function is deemed continuous.

10. The calculator of claim 1, wherein the iterations end if the function is deemed discontinuous.

11. A computer-implemented method of detecting discontinuities in functions, comprising the steps of:

calculating function values for the function, each successive pair of function values representing a line segment;

detecting any line segments having an angle between them greater than a predetermined threshold angle;

bisecting at least one of such segments and calculating a new function value at a bisection point;

analyzing the new function value to determine if the function is continuous; and repeating, for a number of iterations, the bisecting and analyzing steps.

12. The method of claim 11, wherein the bisection point is on the segment having the largest magnitude of change in function value.

13. The method of claim 11, wherein the processor performs the analyzing step by determining whether the new function value is between the function values on the bisected segment.

14. The method of claim 11, further comprising the step of rendering the function as a continuous function if the new function value is between the function values on the bisected segment for at least one iteration.

15. The method of claim 11, further comprising the step of rendering the function as a discontinuous function if the new function value is not between the function values on the bisected segment for at least one iteration.

16. The method of claim 11, further comprising the step of rendering the function with a jump discontinuity if at least one new function value is very close to a function value on the bisected segment.

17. The method of claim 11, further comprising the step of rendering the function with an asymptote if at least one new function value is not between the function values at either end of the bisected segment and not very close to one these function values.

18. The method of claim 17, further comprising the step of analyzing a collection of function values to determine the behavior of the asymptote.

19. The method of claim 18, wherein the behavior of the function at a discontinuity is analyzed with a histogram of function values.

20. The method of claim 11, wherein the iterations end if the function is deemed continuous.

21. The method of claim 11, wherein the iterations end if the function is deemed discontinuous.

* * * * *